US012573080B2

(12) United States Patent
Kim et al.

(10) Patent No.: US 12,573,080 B2
(45) Date of Patent: Mar. 10, 2026

(54) ELECTRONIC DEVICE AND METHOD FOR OBTAINING THREE-DIMENSIONAL (3D) SKELETON DATA OF OBJECT CAPTURED USING PLURALITY OF CAMERAS

(71) Applicant: SAMSUNG ELECTRONICS CO., LTD., Suwon-si (KR)

(72) Inventors: Deokho Kim, Suwon-si (KR); Taehyuk Kwon, Suwon-si (KR); Hwangpil Park, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 372 days.

(21) Appl. No.: 18/082,190

(22) Filed: Dec. 15, 2022

(65) Prior Publication Data

US 2023/0186512 A1 Jun. 15, 2023

Related U.S. Application Data

(63) Continuation of application No. PCT/KR2022/020374, filed on Dec. 14, 2022.

(30) Foreign Application Priority Data

Dec. 15, 2021 (KR) ........................ 10-2021-0179973

(51) Int. Cl.
*G06T 7/73* (2017.01)
*G06T 3/00* (2024.01)
(Continued)

(52) U.S. Cl.
CPC ................ *G06T 7/73* (2017.01); *G06V 10/25* (2022.01); *G06V 10/70* (2022.01); *G06V 40/11* (2022.01);
(Continued)

(58) Field of Classification Search
CPC ............. G06T 7/73; G06T 2207/10012; G06T 2207/20072; G06T 2207/20081;
(Continued)

(56) References Cited

U.S. PATENT DOCUMENTS 9,877,012 B2 1/2018 Uchiyama et al.
10,495,450 B2 12/2019 Nakagawa et al.
(Continued)

FOREIGN PATENT DOCUMENTS

CN 112927259 A 6/2021
EP 3 477 543 A1 5/2019
(Continued)

OTHER PUBLICATIONS

Communications dated Mar. 20, 2023, issued by the International Searching Authority in counterpart International Application No. PCT/KR2022/020374 (PCT/ISA/220, PCT/ISA/210, and PCT/ISA/237).

(Continued)

*Primary Examiner* — Ross Varndell
*Assistant Examiner* — Nhut Huy Pham
(74) *Attorney, Agent, or Firm* — Sughrue Mion, PLLC

(57) ABSTRACT

An electronic device performs a method of obtaining Three-Dimensional (3D) skeleton data of an object obtained by using a first camera and a second camera. The method includes: obtaining a first image using the first camera and obtaining a second image using the second camera; obtaining, from the first image, a first Region Of Interest (ROI) comprising the object; obtaining, from the first ROI, first skeleton data comprising at least one keypoint of the object; obtaining a second ROI from the second image, based on the first skeleton data and information about a relative position between the first camera and the second camera; obtaining, from the second ROI, second skeleton data comprising at (Continued)

OBTAIN FIRST IMAGE VIA FIRST CAMERA AND SECOND IMAGE VIA SECOND CAMERA —S210

OBTAIN FIRST REGION OF INTEREST (ROI) FROM FIRST IMAGE —S220

OBTAIN FIRST SKELETON DATA INCLUDING AT LEAST ONE KEYPOINT OF OBJECT FROM FIRST ROI —S230

OBTAIN SECOND ROI FROM SECOND IMAGE, BASED ON FIRST SKELETON DATA AND INFORMATION ABOUT RELATIVE POSITION BETWEEN FIRST AND SECOND CAMERAS —S240

OBTAIN SECOND SKELETON DATA INCLUDING AT LEAST ONE KEYPOINT OF OBJECT FROM SECOND ROI —S250

OBTAIN 3D SKELETON DATA OF OBJECT, BASED ON FIRST SKELETON DATA AND SECOND SKELETON DATA —S260 least one keypoint of the object; and obtaining 3D skeleton data of the object, based on the first skeleton data and the second skeleton data.

14 Claims, 10 Drawing Sheets

(51) Int. Cl.
| | | |
|---|---|---|
| *G06V 10/25* | (2022.01) | |
| *G06V 10/70* | (2022.01) | |
| *G06V 40/10* | (2022.01) | |

(52) U.S. Cl.
CPC .............. *G06T 2207/10012* (2013.01); *G06T 2207/20072* (2013.01); *G06T 2207/20081* (2013.01); *G06T 2207/30196* (2013.01)

(58) Field of Classification Search
CPC .......... G06T 2207/30196; G06V 10/25; G06V 40/11; G06V 10/70
See application file for complete search history.

(56) References Cited

U.S. PATENT DOCUMENTS

| | | | |
|---|---|---|---|
| 10,552,971 | B2 | 2/2020 | Gu et al. |
| 10,853,958 | B2 | 12/2020 | Choi |
| 10,937,237 | B1 * | 3/2021 | Kim ........................ G06N 3/047 |
| 11,386,637 | B2 | 7/2022 | Park et al. |
| 11,532,127 | B2 | 12/2022 | Meng et al. |
| 11,538,207 | B2 | 12/2022 | Li et al. |
| 11,798,177 | B2 | 10/2023 | Wu |
| 2012/0106784 | A1 | 5/2012 | Cho et al. |
| 2015/0243072 | A1 * | 8/2015 | Haglund ................... G06T 7/55 345/419 |
| 2018/0024641 | A1 | 1/2018 | Mao et al. |
| 2021/0074016 | A1 * | 3/2021 | Li .............................. G06T 7/73 |
| 2021/0174519 | A1 * | 6/2021 | Bazarevsky .............. G06T 7/75 |
| 2023/0009367 | A1 * | 1/2023 | Goodman ................. G06T 7/73 |
| 2023/0028562 | A1 * | 1/2023 | Papon ....................... G06T 7/73 |
| 2023/0298204 | A1 * | 9/2023 | Wang ........................ G06T 7/73 345/419 |

FOREIGN PATENT DOCUMENTS

| | | | |
|---|---|---|---|
| JP | 2019-32600 | A | 2/2019 |
| JP | 2021-56922 | A | 4/2021 |
| KR | 10-2012-0044484 | A | 5/2012 |
| KR | 10-1711736 | B1 | 3/2017 |
| KR | 10-2138680 | B1 | 7/2020 |
| KR | 10-2021-0009458 | A | 1/2021 |
| KR | 10-2021-0011425 | A | 2/2021 |
| KR | 10-2021-0036879 | A | 4/2021 |
| KR | 10-2021-0150881 | A | 12/2021 |

OTHER PUBLICATIONS

Simon et al., "Hand Keypoint Detection in Single Images Using Multiview Bootstrapping", 2017 IEEE Conference on Computer Vision and Pattern Recognition (CVPR), ArXiv, Apr. 25, 2017, 9 total pages, arXiv:1704.07809v1, doi:10.1109/CVPR.2017.494, XP055538561.
Communication dated Nov. 13, 2024, issued by European Patent Office in European Patent Application No. 22907938.9.
Communication dated Jul. 11, 2025, issued by the European Patent Office in counterpart European Application No. 22907938.9.

\* cited by examiner

FIG. 2

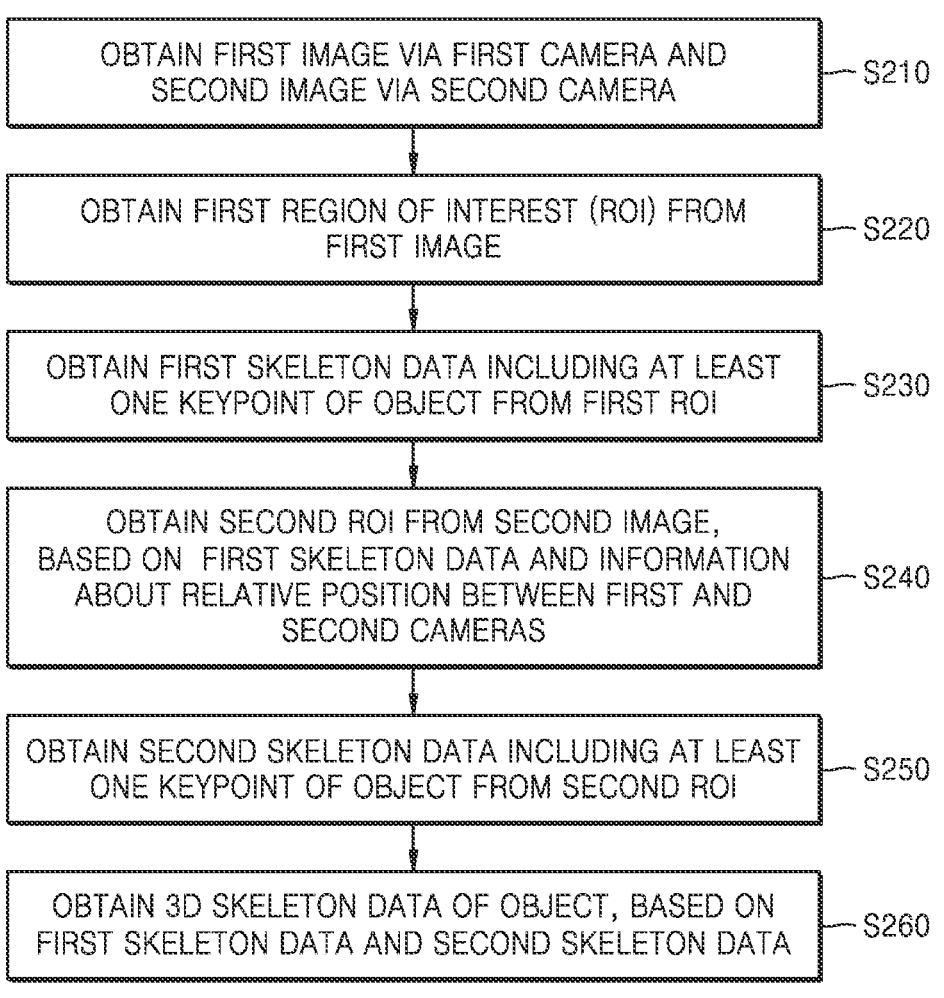

OBTAIN FIRST IMAGE VIA FIRST CAMERA AND SECOND IMAGE VIA SECOND CAMERA — S210

OBTAIN FIRST REGION OF INTEREST (ROI) FROM FIRST IMAGE — S220

OBTAIN FIRST SKELETON DATA INCLUDING AT LEAST ONE KEYPOINT OF OBJECT FROM FIRST ROI — S230

OBTAIN SECOND ROI FROM SECOND IMAGE, BASED ON FIRST SKELETON DATA AND INFORMATION ABOUT RELATIVE POSITION BETWEEN FIRST AND SECOND CAMERAS — S240

OBTAIN SECOND SKELETON DATA INCLUDING AT LEAST ONE KEYPOINT OF OBJECT FROM SECOND ROI — S250

OBTAIN 3D SKELETON DATA OF OBJECT, BASED ON FIRST SKELETON DATA AND SECOND SKELETON DATA — S260

FIG. 3
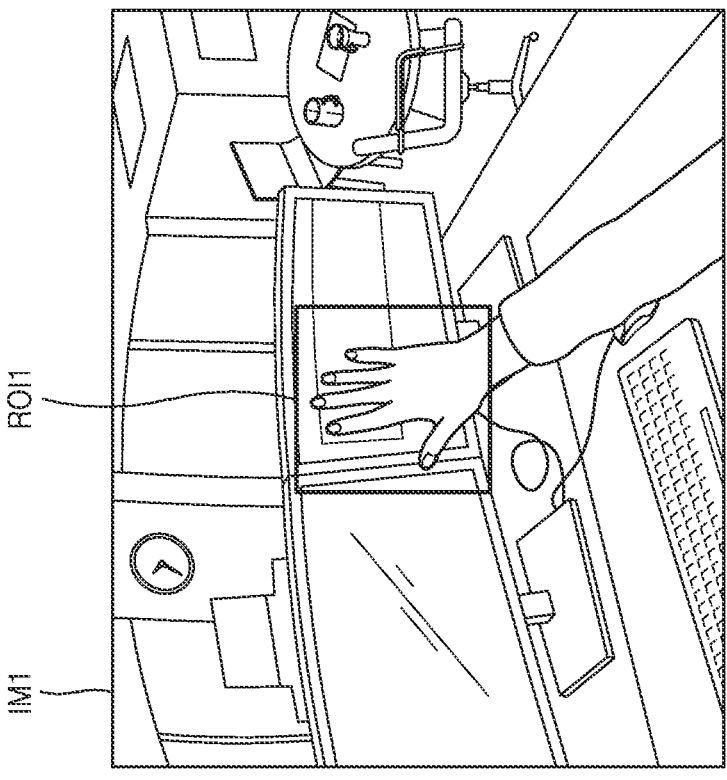
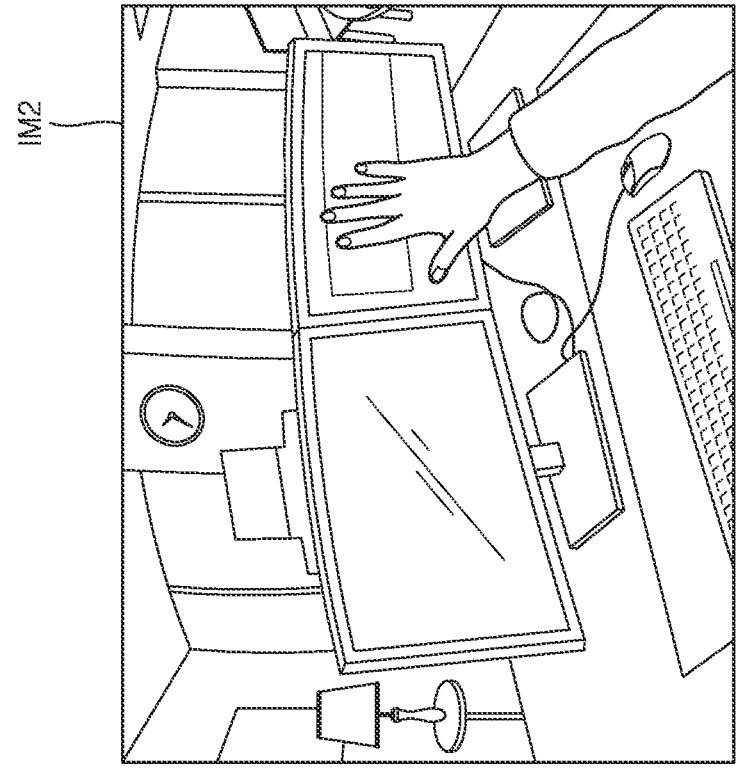

FIG. 4
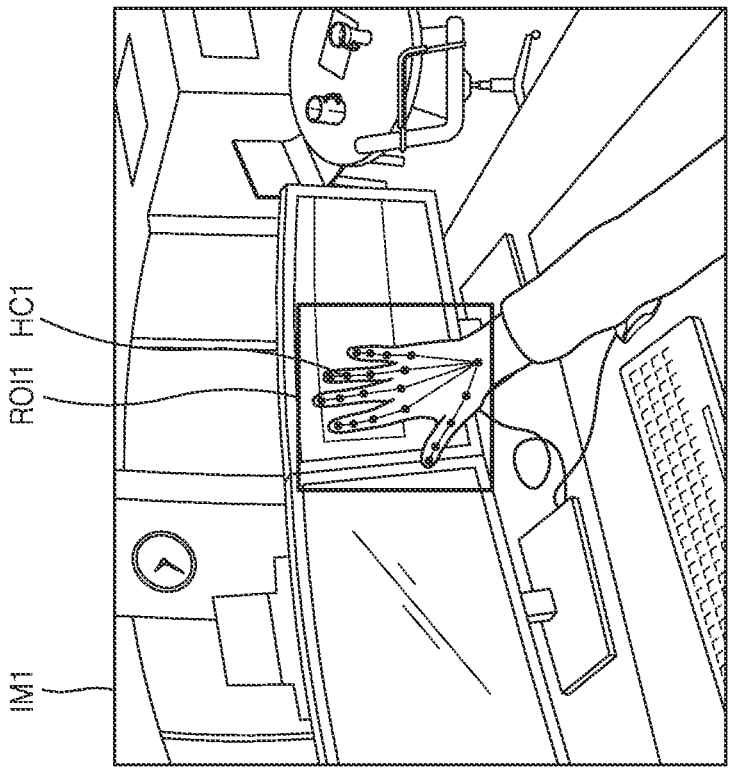
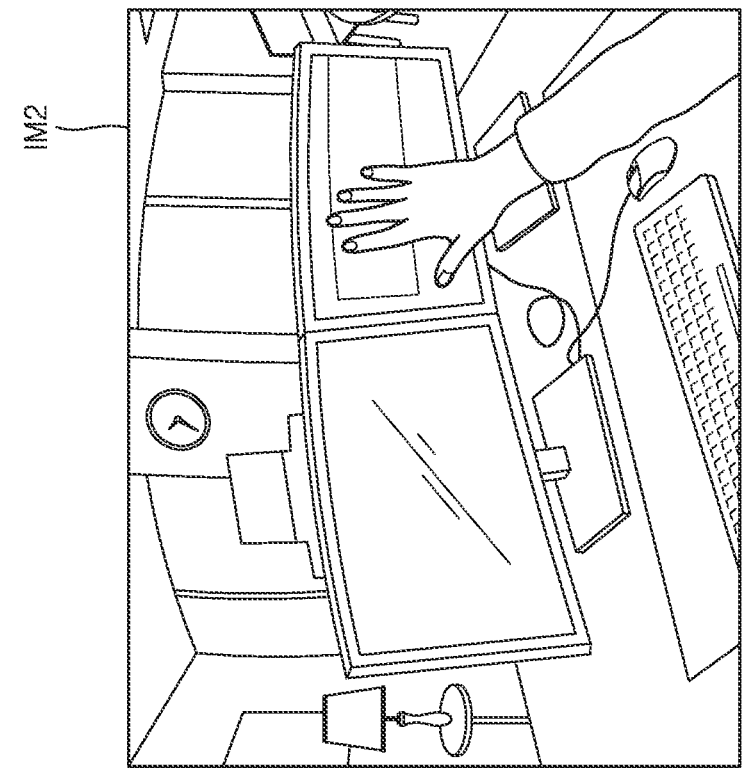

FIG. 5
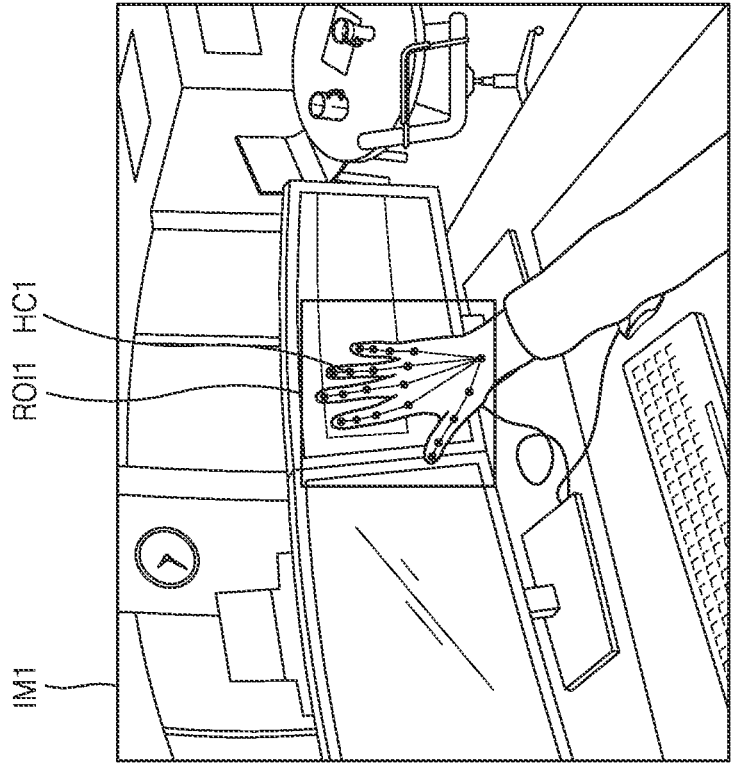
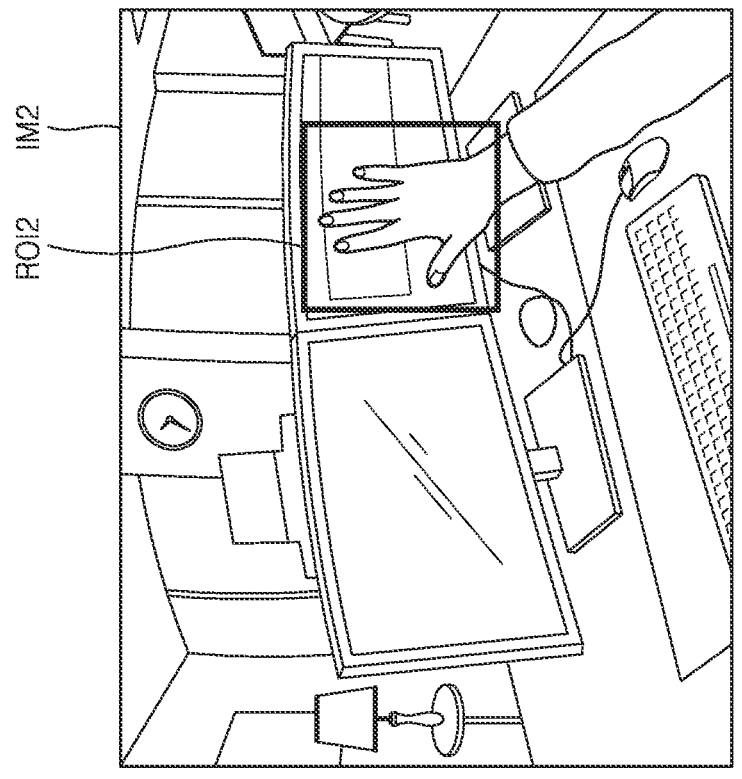

FIG. 6
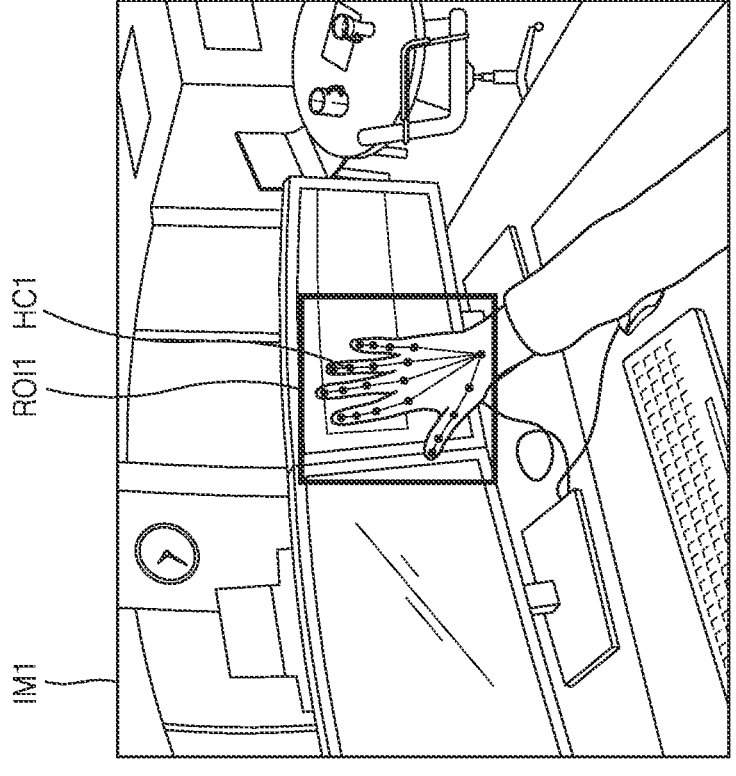
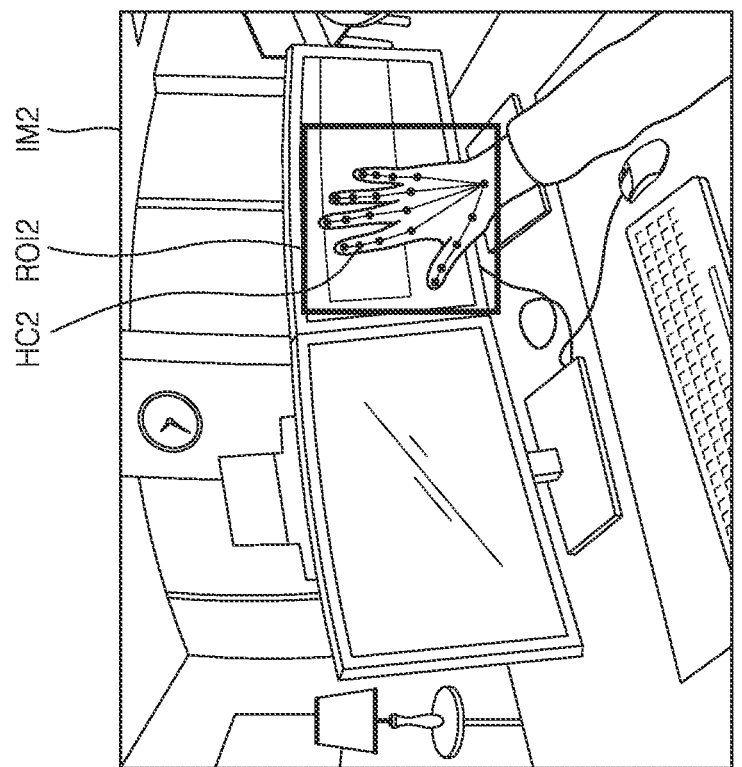

(a)

(b)

(c)

(d)

ELECTRONIC DEVICE AND METHOD FOR OBTAINING THREE-DIMENSIONAL (3D) SKELETON DATA OF OBJECT CAPTURED USING PLURALITY OF CAMERAS

CROSS-REFERENCE TO RELATED APPLICATIONS

This application is a by-pass continuation application of International Application No. PCT/KR2022/020374, filed on 14 Dec. 2022, which based on and claims priority to Korean Patent Application No. 10-2021-0179973, filed on Dec. 15, 2021, in the Korean Intellectual Property Office, the disclosures of which are incorporated by reference herein in their entireties.

BACKGROUND

1. Field

The disclosure relates to an electronic device and method for obtaining three-dimensional (3D) skeleton data of an object from images captured using a plurality of cameras within a limited power budget.

2. Description of Related Art

With technological advances, contents using Virtual Reality (VR) or Augmented Reality (AR) technology have been increasingly distributed. Among electronic devices for providing VR or AR experiences, some electronic devices may be provided in a form to be worn on the human body. Such electronic devices may be generally referred to as wearable devices. A head-mounted electronic device such as a Head-Mounted Display (HMD) may be a type of electronic devices that may be worn on the body. The head-mounted electronic device may be worn on a part of a user's body (e.g., a user's head) to provide a VR or AR environment to the user. The provision of the AR environment may include, for example, provision of various user interfaces and a display capable of implementing AR.

AR technology is a technology that integrates virtual objects or information into a real-world environment to make the virtual objects or information appear as if they exist in a real physical environment. Modern computing and display technologies have enabled the development of systems for delivering AR experiences in which a digitally regenerated image or a portion thereof may be presented to the user in such a manner that the image or portion thereof may be thought of or perceived as being real.

In head-mounted wearable devices for which touch manipulation is not allowed and use of a separate input device is difficult, a hand interaction using a three-dimensional (3D) pose and gesture of a user's hand or body part plays an important role as an input interface. Therefore, for implementation of a more realistic AR technology, a technology for accurately estimating a 3D hand pose (shape) and accurately recognizing a hand gesture is required.

As AR technology has attracted increasing attention, various technologies for implementing AR have been actively developed. In particular, lightweight head-mounted electronic devices have limited battery capacity. Accordingly, there is a need for a technology capable of reducing the amount of power consumed by an electronic device when a user's hand pose and gesture are recognized using a plurality of cameras.

An embodiment of the disclosure may provide an electronic device and method capable of reducing the number of times a detection operation for identifying a location of an object in an image is performed by performing an operation of detecting a region of interest (ROI) including an image corresponding to the object only with respect to an image obtained using one of a plurality of cameras included in the electronic device, so that a total computation time required for an operation of obtaining three-dimensional (3D) skeleton data of the object and the amount of power consumed by the electronic device may be reduced.

A technical problem to be solved by an embodiment of the disclosure is not limited to the above technical problem, and other technical problems may be inferred from the following embodiments of the disclosure.

SUMMARY

According to an aspect of the disclosure, an electronic device performs a method of obtaining Three-Dimensional (3D) skeleton data of an object obtained by using a first camera and a second camera. The method includes: obtaining a first image using the first camera and obtaining a second image using the second camera; obtaining, from the first image, a first Region Of Interest (ROI) comprising the object; obtaining, from the first ROI, first skeleton data comprising at least one keypoint of the object; obtaining a second ROI from the second image, based on the first skeleton data and information about a relative position between the first camera and the second camera; obtaining, from the second ROI, second skeleton data comprising at least one keypoint of the object; and obtaining 3D skeleton data of the object, based on the first skeleton data and the second skeleton data.

According to another aspect of the disclosure, an electronic device includes: a first camera; a second camera; a storage storing at least one instruction; and at least one processor is configured to electrically connect with the first camera and the second camera and configured to execute the at least one instruction stored in the storage to: obtain a first image via a first camera and obtain a second image via a second camera, obtain, from the first image, a first Region Of Interest (ROI) comprising an object, obtain, from the first ROI, first skeleton data comprising at least one keypoint of the object, obtain a second ROI from the second image, based on the first skeleton data and information about a relative position between the first camera and the second camera, obtain, from the second ROI, second skeleton data comprising at least one keypoint of the object, and obtain Three-Dimensional (3D) skeleton data of the object, based on the first skeleton data and the second skeleton data.

According to another aspect of the disclosure, a non-transitory computer-readable recording medium has recorded thereon a program for performing the above-described method on a computer.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart of a method, performed by an electronic device, of obtaining 3D skeleton data of an object by using a plurality of cameras, according to one embodiment;

FIG. 3 is a diagram for describing an operation of obtaining a region of interest (ROI) from one camera image, according to one embodiment;

FIG. 4 is a diagram for describing an operation of obtaining hand skeleton data from an ROI in a camera image, according to one embodiment;

FIG. 5 is a diagram for describing an operation of obtaining an ROI in the other camera image based on hand skeleton data obtained from a ROI in one camera image, according to one embodiment;

FIG. 6 is a diagram for describing an operation of obtaining hand skeleton data from an ROI in the other camera image, according to one embodiment;

DETAILED DESCRIPTION

Figure 1:
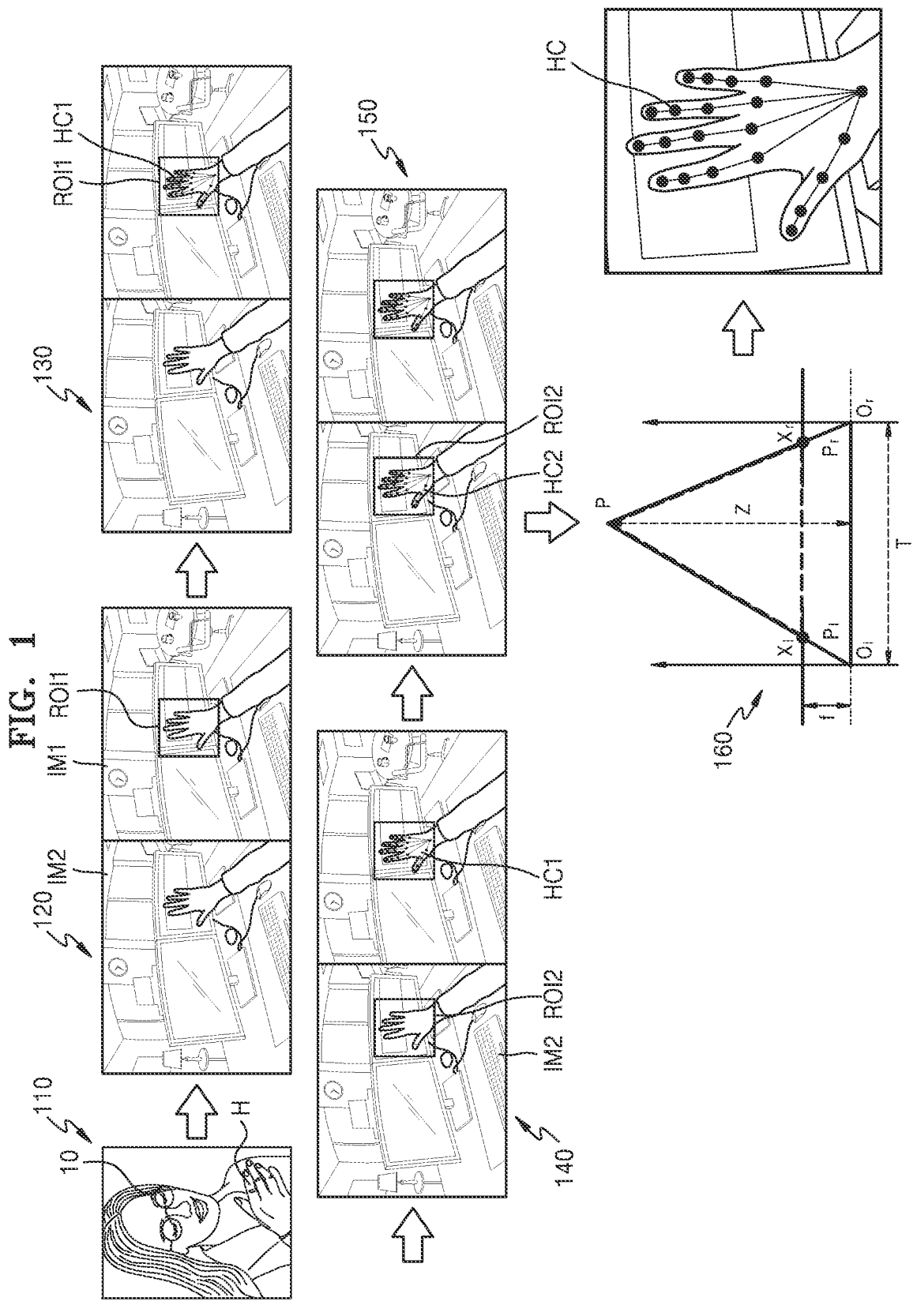
FIG. 1 is a schematic diagram illustrating a method, performed by an electronic device, of obtaining three-dimensional (3D) skeleton data of a hand by using a plurality of cameras, according to one embodiment.

Throughout the disclosure, the expression "at least one of a, b or c" indicates only a, only b, only c, both a and b, both a and c, both b and c, all of a, b, and c, or variations thereof.

Embodiments of the disclosure will now be described more fully hereinafter with reference to the accompanying drawings so that they may be easily implemented by one of ordinary skill in the art. However, embodiments of the disclosure may have different forms and should not be construed as being limited to the embodiments set forth herein. In addition, parts not related to descriptions of the disclosure are omitted to clearly explain embodiments of the disclosure in the drawings, and like reference numerals denote like elements throughout.

As the terms used herein, general terms that are currently widely used are selected by taking functions according to the disclosure into account, but the terms may have different meanings according to the intention of one of ordinary skill in the art, precedent cases, or advent of new technologies. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by a person of ordinary skill in the art.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Throughout the specification, it will be understood that when an element is referred to as being "connected" or "coupled" to another element, it can be "directly connected" to or "electrically coupled" to the other element with one or more intervening elements therebetween. Furthermore, when a part "includes" or "comprises" an element, unless there is a particular description contrary thereto, the part may further include other elements, not excluding the other elements.

The expression "configured to (or set to)" used herein may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations or a general-purpose processor (e.g., a central processing unit (CPU) or an application processor (AP)) capable of performing the corresponding operations by executing one or more software programs stored in a memory.

According to the disclosure, functions related to artificial intelligence (AI) may operate via a processor and a memory. The processor may be configured as one or a plurality of processors. In this case, the one or plurality of processors may be a general-purpose processor such as a CPU, an AP, or a digital signal processor (DSP), a dedicated graphics processor such as a graphics processing unit (GPU) or a vision processing unit (VPU), or a dedicated AI processor such as a neural processing unit (NPU). The one or plurality of processors may control input data to be processed according to predefined operation rules or an AI model stored in the memory. Alternatively, when the one or more processors are a dedicated AI processor, the dedicated AI processor may be designed with a hardware structure specialized for processing a particular AI model.

The predefined operation rules or AI model may be created via a training process. The creation via the training process means that the predefined operation rules or AI model set to perform desired characteristics (or purpose) are created by training a basic AI model (or a deep learning model) based on a large number of training data via a learning algorithm. The training process may be performed by an apparatus itself in which AI is performed or via a separate server and/or a system. Examples of a learning algorithm may include, but are not limited to, supervised learning, unsupervised learning, semi-supervised learning, and reinforcement learning.

An AI model (or deep learning model) may include a plurality of neural network layers. Each of the neural network layers has a plurality of weight values and each of the neural network layers may perform neural network computations via calculations between a result of computations in a previous layer and a plurality of weight values. A plurality of weight values assigned to each of the neural network layers may be optimized based on a result of training the AI model. For example, a plurality of weight values may be modified to reduce or minimize a loss or cost value obtained in the AI model during a training process. An artificial neural network may include a Deep Neural Network (DNN) and may be, for example, a Convolutional Neural Network (CNN), a DNN, a Recurrent Neural Network (RNN), a Restricted Boltzmann Machine (RBM), a Deep Belief Network (DBN), a Bidirectional Recurrent DNN (BRDNN), or Deep Q-Networks (DQN) but is not limited thereto.

In the disclosure, a 'Field Of View' (FOV) of a camera indicates an area of an image or a video captured via the camera. A FOV may also be referred to as a 'FOV degree.' The area of the image or the video captured by the camera may indicate an area of an image or the video displayed within a display screen area.

In the disclosure, a 'video' or an 'image sequence' may indicate a moving picture or a moving video. A video or an image sequence may include a series of still images having a temporal order.

In the disclosure, a 'video frame' or an 'image' may represent a separate still image output on a display. In other words, the video frame or the image may be an individual image of a scene that when displayed in a series of scenes at short time intervals, creates a moving picture.

In the disclosure, a 'keypoint' or a 'feature point' may indicate a point in a video or an image that is distinguished from the surrounding background or is easily identified. A keypoint or a feature point may be used when tracking or recognizing an object in an image. For example, a point that is easily identifiable even when a shape, size, or a position of an object is changed or even when a viewpoint or a lighting of a camera changes may be set as a keypoint or a feature point. For example, corner points in an image of an object or points located on boundary lines of the object may be keypoints or feature points. When the object to be tracked is a user's hand, a keypoint or feature point may be included in joints. Throughout the present disclosure, a user's hand is used as an example of the object in an image or a video. The present disclosure is not limited to embodiments related to a user's hand. A user's other body parts can be the object in an image or a video, according to some embodiments of the present disclosure. Non-human parts or elements (e.g., animals' hands or foots) can be the object in an image or a video, according to some embodiments of the present disclosure.

In the disclosure, a 'graph' may represent a set of structured information comprising nodes and edges connecting the nodes. A graph may be used to structurally represent a connection relationship between nodes. The graph may be created by expressing nodes and hierarchical relationships between nodes, and may have a tree structure in which nodes are connected to each other through edges.

In the disclosure, 'skeleton data' of an object may include at least one keypoint or feature point of the object as a joint. The skeleton data may be a 'data set' including pieces of coordinate information of a plurality of joints. In the disclosure, the skeleton data may include a 'skeleton graph'. The skeleton graph may include at least one keypoint or feature point of the object as a node. In other words, a node of the skeleton graph may correspond to a joint (keypoint or feature point) of the object. For example, a keypoint or feature point of the hand may be included in joints of the hand. The skeleton graph may include edges connecting nodes corresponding to pairs of adjacent joints on the same finger. The skeleton graph of the hand may be used to determine a Three-Dimensional (3D) pose of the hand.

In the disclosure, a 'gesture' may represent a movement of an object such as a body part, e.g., a hand, a foot, etc., a non-body part, or a specific item.

Hereinafter, the disclosure is described in detail with reference to the accompanying drawings.

FIG. 1 is a schematic diagram illustrating a method, performed by an electronic device 10, of obtaining 3D skeleton data HO of a hand H by using a plurality of cameras, according to one embodiment.

According to an embodiment of the disclosure, the electronic device 10 may include an Augmented Reality (AR) device capable of obtaining a video or an image sequence by using a plurality of cameras. The AR device is a device capable of realizing AR, and may display an image including a physical object existing in the real world and a virtual object.

For example, the electronic device 10 may include AR glasses in the form of eye glasses worn by the user on the face, a Head-Mounted Display (HMD), a Virtual Reality Headset (VRH), or an AR Helmet (ARH) worn on the head, etc. However, the electronic device 10 of the disclosure is not limited to the above-described examples, and may include various types of devices that provide AR or VR services to the user or recognize a Three-Dimensional (3D) hand pose and a hand gesture by using a plurality of cameras.

In one embodiment, a 3D pose of the hand H may be recognized using 'hand skeleton detection and tracking' technology. The hand skeleton detection and tracking technology is a technology for detecting moving joints from an image of the user's hand H and then segmenting a predetermined skeleton structure and projecting joints in the skeleton structure on the image. In one embodiment, the skeleton structure of a human hand may include five (5) tip points of each finger, 15($5\times3$) joint points of each finger, and an one (1) palm point, but is limited thereto.

In the electronic device 10 that provides AR services, a hand interaction using 3D pose and gesture of the user's hand H functions as one of the important input interfaces. In one embodiment, the electronic device 10 may include a plurality of cameras for obtaining a 3D image of the user's hand H. When the plurality of cameras (e.g., two cameras) are used, a distance from each of a plurality of images respectively obtained from the plurality of cameras to an object to be imaged may be calculated, and a 3D image of the object may be obtained.

A 3D image of a specific object may include depth information of each pixel in an image corresponding to the object. A set of the plurality of cameras may correspond to a computational camera, and a 3D image including depth information may be generated by reprocessing images of subjects formed by lenses of the plurality of cameras using computation. In one embodiment, the 3D image of the specific object may include pieces of 3D coordinate information of keypoints of the object.

For example, the user's hand H may include a plurality of keypoints respectively corresponding to a plurality of joints, and the 3D image of the user's hand H, which is obtained using the plurality of cameras, may include 3D coordinate information of each of the plurality of joints with respect to a preset origin.

Referring to FIG. 1, in operation 110, the electronic device 10 may capture an image of the user's hand H wearing the electronic device 10 by using the plurality of cameras. In one embodiment, the electronic device 10 may include two cameras. The electronic device 10 may obtain a first image IM1 using a first camera and a second image IM2 using a second camera. The first image IM1 and the second image IM2 may each include a hand image corresponding to the user's hand H.

In operation 120, the electronic device 10 may obtain a first Region Of Interest (ROI) ROI1 including a hand image corresponding to the user's hand H from the first image IM1. For example, the first ROI ROI1 may have a block or window shape including the hand image. In one embodiment, a first deep learning model trained to use the first image IM1 as an input value and output an image region including the hand image as the first ROI ROI1 may be used in an operation of obtaining the first ROI ROI1 from the first image IM1. The operation of obtaining the first ROI ROI1 from the first image IM1 is described in more detail below with reference to FIG. 3.

In operation 130, the electronic device 10 may obtain first skeleton data HC1 including at least one keypoint of the hand H from the first ROI ROI1. For example, the first skeleton data HC1 may be a skeleton graph including edges and nodes. The at least one keypoint of the hand H may be included in joints of the hand H. For example, the first skeleton data HC1 may be a data set including coordinate information of at least one keypoint (e.g., joint) of the hand H. Coordinate information of a keypoint of the hand H may include Two-Dimensional (2D) or 3D coordinate values of the keypoint.

In one embodiment, in the operation of obtaining the first skeleton data HC1 from the first ROI ROI1, a second deep learning model may be used. The second deep learning model may be trained to use the first ROI ROI1 as an input value and to output the first skeleton data HC1 of the hand H. For example, the second deep learning model may be trained to use the first ROI ROI1 as an input value and to output the first skeleton data HC1 including coordinate values of the at least one keypoint of the hand H. In one embodiment, each of the keypoints included in the first skeleton data HC1 obtained using the second deep learning model may correspond to 3D position coordinates with respect to a preset origin in space.

The operation of obtaining the first skeleton data HC1 including at least one keypoint of the hand H from the first ROI ROI1 is described in more detail below with reference to FIG. 4.

In operation 140, the electronic device 10 obtains a second ROI ROI2 from the second image IM2, based on the first skeleton data HC1 and information about a relative position between the first camera and the second camera. The second ROI ROI2 may represent a region including an image corresponding to the user's hand H in the second image IM2. In one embodiment, an operation of obtaining the second ROI ROI2 from the second image IM2 based on the first skeleton data HC1 may include projecting 3D position coordinates corresponding to at least one keypoint included in the first skeleton data HC1 to 2D position coordinates on the second image IM2, identifying, in the second image IM2, a block including 2D position coordinates of the keypoints included in the first skeleton data HC1, and determining the identified block as the second ROI ROI2. In this case, in projecting the 3D position coordinates of the keypoint included in the first skeleton data HC1 to the 2D position coordinates on the second image IM2, information about the relative position between the first camera and the second camera may be used. The information about the relative position between the first camera and the second camera may correspond to a distance or a baseline between the first camera and the second camera. The operation of obtaining the second ROI ROI2 from the second image IM2 based on the first skeleton data HC1 is described in more detail below with reference to FIG. 5.

In operation 150, the electronic device 10 may obtain second skeleton data HC2 including at least one keypoint of the hand H from the second ROI ROI2. For example, the second skeleton data HC2 may be a skeleton graph including edges and nodes. The at least one keypoint of the hand H may be included in joints of the hand H. For example, the second skeleton data HC2 may be a data set including coordinate information of the at least one keypoint (e.g., joint) of the hand H.

In one embodiment, in the operation of obtaining the second skeleton data HC2 from the second ROI ROI2, a third deep learning model may be used. The third deep learning model may be trained to use the second ROI ROI2 as an input value and to output the second skeleton data HC2 of the hand H. For example, the third deep learning model may be trained to use the second ROI ROI2 as an input value and to output the second skeleton data HC2 that is a skeleton graph including coordinate values of the at least one keypoint of the hand H. In one embodiment, each of the keypoints included in the second skeleton data HC2 obtained using the third deep learning model may correspond to 2D position coordinates with respect to a preset origin on a plane including the second image IM2.

The operation of obtaining the second skeleton data HC2 including at least one keypoint of the hand H from the second ROI ROI2 is described in more detail below with reference to FIG. 6.

In operation 160, the electronic device 10 may obtain 3D skeleton data HC of the hand H, based on the first skeleton data HC1 and the second skeleton data HC2.

In one embodiment, the keypoints included in the first skeleton data HC1 correspond to 3D position coordinates with respect to the preset origin in space, and the keypoints included in the second skeleton data HC2 may correspond to 2D position coordinates with respect to the preset origin on the plane including the second image IM2. In this case, the electronic device 10 may project 3D position coordinates corresponding to each keypoint in the first skeleton data HC1 to 2D position coordinates on the first image IM1 Subsequently, 3D position coordinates may be obtained for each keypoint in the first skeleton data HC1 by using 2D position coordinates of a keypoint projected onto the first image IM1 and 2D position coordinates of a corresponding keypoint in the second skeleton data HC2. For example, a triangulation method may be used in an operation of obtaining 3D position coordinates by using two 2D position coordinates.

An operation of obtaining the 3D skeleton data HC of the object (hand H), based on the first skeleton data HC1 and the second skeleton data HC2, is described in more detail below with reference to FIGS. 7 and 8.

In the electronic device 10 that provides AR services to the user, such as AR glasses, a hand interaction serves as one of the important input interfaces. The electronic device 10, such as AR glasses or the like, may obtain a control signal through an estimated 3D pose and a recognized gesture of the user's hand of body part.

In one embodiment, the electronic device 10 may use the plurality of cameras to accurately estimate a 3D pose of the user's hand H and estimate depths (relative positions on a z-axis) of joints of the hand H from 2D camera images captured at different viewpoints and then reconstruct a 3D image from the 2D camera images by using information about the estimated depths. Among a series of operations for obtaining 3D skeleton structure information of the hand H by using the plurality of cameras as described above, a large amount of power is consumed, particularly in an operation of identifying a location of the hand H from each camera image.

Therefore, according to one embodiment, the number of times that a detection operation for identifying a location where the hand H is included in an image is performed may be reduced by performing an operation of detecting an ROI including an image corresponding to the hand H only with respect to an image obtained using one of the plurality of cameras included in the electronic device 10. Furthermore, a total computation time required for an operation of obtaining 3D skeleton data of the hand H may be reduced, and the amount of power consumed by the electronic device 10 may be reduced.

FIG. 2 is a flowchart of a method, performed by an electronic device, of obtaining 3D skeleton data of an object by using a plurality of cameras, according to one embodiment.

In operation S210, the electronic device obtains a first image by using a first camera and a second image by using a second camera. For example, the first image and the second image may each include an image (e.g., hand image) corresponding to an object (e.g., user's hand). User's hand is used here as an example of an object photographed by the first camera and the second camera. Other human body objects, such as arms, toes, and non-human parts may become an object according to some embodiments of the present disclosure. That is, according to some embodiments of the present disclosure, the first image and the second image may be images corresponding to objects photographed by the first camera or the second camera, respectively, and the object may have a specific skeleton structure.

In operation S220, the electronic device may obtain, from the first image, a first ROI including an image corresponding to the object (e.g., user's hand). In one embodiment, the first deep learning model trained to use the first image as an input value and output an image region including the object image as the first ROI may be used in the operation of obtaining the first ROI from the first image.

In operation S230, the electronic device may obtain first skeleton data including at least one keypoint of the object (e.g., hand) from the first ROI. In one embodiment, the second deep learning model trained to use the first ROI as an input value and output the first skeleton data including coordinate values of the at least one keypoint of the object (e.g., hand) may be used in the operation of obtaining the first skeleton data from the first ROI.

In one embodiment, the first skeleton data obtained using the second deep learning model may include 3D position coordinates of each of the keypoints with respect to a preset origin in space. For example, the first skeleton data may have 3D coordinate values $(x_n, y_n, z_n)$ corresponding to a particular joint n. The 3D coordinate values $(x_n, y_n, z_n)$ corresponding to the particular joint n may indicate a position of the joint in a 3D space relative to the preset origin.

In operation S240, the electronic device may obtain a second ROI from the second image based on the first skeleton data. In one embodiment, an operation of obtaining the second ROI from the second image based on the first skeleton data may include projecting 3D position coordinates of a keypoint included in the first skeleton data to 2D position coordinates on the second image, identifying a block including 2D position coordinates in the second image, and determining the identified block as the second ROI.

In one embodiment, in projecting the 3D position coordinates of the keypoint included in the first skeleton data to the 2D position coordinates on the second image, information about a relative position (e.g., a baseline) between the first camera and the second camera may be used. For example, according to a 'stereo vision' technique, 3D depth information may be obtained by calculating a disparity between 2D images obtained using two cameras located at different positions. The disparity may indicate a difference in positions on a specific axis that occurs in the first and second images according to a degree to which the first camera and the second camera are separated from each other with respect to the corresponding axis. Therefore, 3D position coordinates predicted through the first image in 2D, view angles of the first camera and the second camera, and information about the relative position between the first camera and the second camera may be used to predict which portion of the second image corresponds to a region where the object (e.g., hand) image is represented in the first image.

In operation S250, the electronic device may obtain second skeleton data including at least one keypoint of the object (e.g., hand) from the second ROI. In one embodiment, the third deep learning model trained to use the second ROI as an input value and output the second skeleton data including coordinate values of the at least one keypoint of the object may be used in the operation of obtaining the second skeleton data from the second ROI.

In one embodiment, the second skeleton data obtained using the third deep learning model may include 2D position coordinates of each of the keypoints with respect to a preset origin on a plane of the second image. For example, the second skeleton data may have 2D coordinate values $(x_m, y_m)$ corresponding to a particular joint m. The 2D coordinate values $(x_m, y_m)$ corresponding to the particular joint m may indicate a position of the joint on a 2D plane relative to the preset origin.

In operation S260, the electronic device may obtain 3D skeleton data of the object (e.g., hand), based on the first skeleton data and the second skeleton data.

In one embodiment, the first skeleton data may include 3D position coordinates of the keypoints with respect to the preset origin in the space, and the second skeleton data may include 2D position coordinates of the keypoints with respect to the preset origin on the plane of the second image. In this case, the electronic device may project the 3D position coordinates of the keypoints included in the first skeleton data to 2D position coordinates on a plane of the first image. Subsequently, 3D position coordinates may be obtained for each keypoint in the first skeleton data by using 2D position coordinates of a keypoint projected onto the plane of the first image and corresponding 2D position coordinates included in the second skeleton data. For example, a triangulation method may be used in an operation of obtaining 3D position coordinates by using two 2D position coordinates. For example, according to the 'stereo vision' technique, 3D depth information may be obtained by calculating a disparity between 2D images obtained using two cameras located at different positions. Thus, 3D structure information of the object (e.g., user's hand) may be obtained using the 2D position coordinates projected onto the plane of the first image, the 2D position coordinates obtained from the second image, and information about the relative position between the first camera and the second camera.

In one embodiment, the first skeleton data may include 3D position coordinates of the keypoints with respect to the preset origin in the space, and the second skeleton data may also include 3D position coordinates of corresponding keypoints with respect to the same origin. In this case, the electronic device may determine, as 3D position coordinates of each keypoint, an average value of 3D position coordinates of a keypoint in the first skeleton data and 3D position coordinates of the corresponding keypoint in the second skeleton data.

In one embodiment, the second deep learning model trained to use the second ROI as an input value and output, as the second skeleton data, a graph including at least one keypoint of the object (e.g., hand) as a joint may be used in the operation of obtaining the second skeleton data from the second ROI. The second deep learning model may output 3D position coordinates corresponding to keypoints in skeleton data, and the third deep learning model may output 2D position coordinates corresponding to the keypoints in the skeleton data.

In one embodiment, the electronic device may determine as 3D position coordinates of each keypoint a value obtained by weight-combining position coordinates in the first skeleton data with position coordinates in the second skeleton data having the same dimension as the position coordinates in the first skeleton data.

FIG. 3 is a diagram for describing an operation of obtaining an ROI (e.g., a first ROI ROI1) from one camera image (e.g., a first camera image IM1), according to one embodiment.

According to an embodiment of the disclosure, an electronic device may obtain the first ROI ROI1 including an image corresponding to an object (e.g., a user's hand) from the first image IM1 obtained using a first camera from among the first image IM1 and a second image IM2 obtained using a second camera. For example, the first ROI ROI1 may have a block or window shape including the hand image. In one embodiment, the first deep learning model trained to use the first image IM1 as an input value and output an image region including the hand image as the first ROI ROI1 may be used in an operation of obtaining the first ROI ROI1 from the first image IM1.

In one embodiment, a frame scanning operation or an edge analysis method may be used in the operation of detecting the first ROI ROI1 in the first image IM1. The frame scanning operation is a method used to search for, after setting blocks of a certain size, a region including a hand by scanning the blocks from the top left corner to the bottom right corner. In this case, the size of a block may be preset. When it is determined, for example by a processor, that there is a plurality of regions including the hand due to a small block size, the scanning operation may be performed again by increasing the block size, and when it is determined, for example by a processor, that a pixel region including the hand in a particular block is small due to a large block size, the scanning operation may be performed again within the particular block by reducing the block size. For example, the size of the finally selected first ROI ROI1 may vary according to a distance from the electronic device to the hand. For example, when the hand is located close to a camera, an image corresponding to the hand may be large, and thus, a block (window) size of the first ROI ROI1 may be large. For example, when the hand is located far from the camera, the block (window) size of the first ROI ROI1 may be set to be small.

In one embodiment, a first deep learning algorithm or other algorithms may be used in an operation of detecting a location of the first ROI ROI1 in the first image IM1 In the related art, an operation of detecting a location of a hand (i.e., an ROI) is performed for each of a plurality of images obtained by different cameras. On the other hand, in a method according to one embodiment, the electronic device may detect the first ROI ROI1 including the image corresponding to the user's hand only in one image (the first image IM1) among a plurality of images obtained by a plurality of cameras. Therefore, according to one embodiment, an operation of detecting an ROI may not be performed with respect to all of a plurality of images obtained by a plurality of cameras, and thus, power consumption may be reduced.

FIG. 4 is a diagram for describing an operation of obtaining first skeleton data HC1 of an object (e.g., a hand) from a first ROI ROI1 in a first camera image IM1, according to one embodiment.

Referring to FIG. 4, an electronic device may obtain the first skeleton data HC1 of the hand from the first ROI ROI1. The first skeleton data HC1 may be represented as a graph including a joint as a node and a line connecting joints as an edge. The first skeleton data HC1 may represent a 'data set' including a joint as a keypoint and coordinate values for each keypoint. In other words, according to one embodiment, the electronic device may obtain, from the first ROI ROI1, the first skeleton data HC1 (or a first skeleton graph or a first data set) including coordinate information of a joint (or a keypoint or a node). At least one keypoint of the hand may be included in joints of the hand. For example, a hand skeleton graph may include 21 points. The 21 points may be located on joints of the five fingers and the palm.

In one embodiment, the second deep learning model trained to use the first ROI ROI1 as an input value and output the first skeleton data HC1 including coordinate values of at least one keypoint of the hand may be used in the operation of obtaining the first skeleton data HC1 from the first ROI ROI1. In one embodiment, the first skeleton data HC1 obtained using the second deep learning model may include 3D position coordinates of each of the keypoints with respect to a preset origin in space.

In one embodiment, 3D coordinate information of hand skeleton may be detected from the location of the hand (the first ROI ROI1) in the first camera image IM1. A second deep learning algorithm or other algorithms may be used in an operation of detecting 3D coordinate values for the joints of the hand. In one embodiment, a 3D structure of the hand predicted from a single 2D camera image may have lower accuracy than a 3D structure of the hand obtained using two 2D images.

In one embodiment, a method of estimating a 3D structure of the hand according to relative positions between joints may be used in an operation of obtaining a 3D structure of the hand from a single camera image. The method of estimating 3D coordinates of the hand according to the relative positions between the joints may use a probabilistic estimation from a database in which a 'relative positional relationship between joints' and a '3D pose of the hand' are matched with each other and stored.

FIG. 5 is a diagram for describing an operation of obtaining a second ROI ROI2 in the other camera image (a second camera image IM2) based on the first skeleton data HC1 of the object (e.g., hand) obtained from the first ROI ROI1 in the first camera image IM1, according to one embodiment.

In one embodiment, the second ROI ROI2 predicted to include an image corresponding to the user's hand in the other camera image (the second camera image IM2) may be obtained by using the first skeleton data HC1 of the hand obtained from one camera image (the first camera image IM1). For example, the second ROI ROI2 corresponding to a location of the hand in the other camera image may have a quadrangular block (a box or window) shape.

In one embodiment, in projecting 3D position coordinates of a keypoint included in the first skeleton data HC1 to 2D position coordinates on the second camera image IM2, information about a relative position (e.g., a baseline) between first and second cameras may be used. For example, 3D depth information may be obtained by calculating a disparity between 2D images obtained using two cameras located at different positions. The disparity may indicate a difference in positions on a specific axis that occurs in the first and second camera images IM1 and IM2 according to a degree to which the first camera and the second camera are separated from each other with respect to the corresponding axis. Therefore, 3D position coordinates predicted through the first camera image IM1 that is a 2D image, view angles of the first camera and the second camera, and information about the relative position between the first camera and the second camera may be used to predict which portion of the second camera image IM2 is to correspond to a region where an image of the user's hand is represented in the first camera image IM1.

In one embodiment, the first deep learning model may be applied again to the obtained second ROI ROI2 to determine an accurate region including an actual image of the user's hand. In this case, because a size of an image (a size of the obtained second ROI ROI2) used for the operation of detecting the location of the hand is reduced compared to that of an original image (the second camera image IM2), a total computational load of the electronic device may be reduced.

Equation 1 below may be used in the operation of obtaining the second ROI ROI2 in the other camera image from the first skeleton data HC1 that is 3D skeleton data of the hand obtained from the one camera image (the first camera image IM1).

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \qquad \text{[Equation 1]}$$

Here, (X,Y,Z) denotes 3D coordinate values in the first skeleton data HC1 obtained from the first ROI ROI1, and (u,v) denotes 2D coordinate values obtained by projecting the 3D coordinate values in the first skeleton data HC1 obtained from the first ROI ROI1 onto a plane of second camera image IM2.

In Equation 1, $f_x$, $f_y$, $c_x$, and $c_y$ denote properties determined based on internal factors of the electronic device, and may be used in the operation of transforming camera intrinsic parameter space coordinates (3D) to image pixel coordinates (2D) and preset during manufacturing of a camera module. For example, $f_x$ and $f_y$ may be determined based on a focal length of the camera (e.g., the second camera), and $c_x$ and $c_y$ may be determined based on a distance from a center of the image (e.g., the second camera image IM2) to a top left corner thereof.

In Equation 1, $r_{ij}$ and $t_k$ (i, j, k=1 or 2 or 3) denote properties determined based on external factors of the electronic device, and may be preset during manufacturing of the electronic device. For example, $r_{ij}$ may be a parameter representing an axis rotation angle from a preset origin (e.g., a center point of the electronic device or a middle point between the first camera and the second camera) to the camera (e.g., the second camera), and $t_k$ may be a parameter representing a distance from the preset origin (e.g., the center point of the electronic device or the middle point between the first camera and the second camera) to the camera (e.g., the second camera).

In one embodiment, 2D coordinates to which 3D coordinates of each hand joint are projected on the second camera image IM2 may be calculated. According to an embodiment of the disclosure, the electronic device may identify a minimum value and a maximum value on an x-axis and a minimum value and a maximum value on a y-axis from among 2D coordinate values of hand joints.

$X_{min}=\min(x_0, x_1, \ldots, x_n)$
$X_{max}=\max(x_0, x_1, \ldots, x_n)$
$y_{min}=\min(y_0, y_1, \ldots, y_n)$
$y_{max}=\max(y_0, y_1, \ldots, y_n)$ Here, n may denote the number of hand joints (or the number of joints or the number of hand keypoints) (e.g., n=21), and a rectangular block having a line connecting $(x_{min}, y_{min})$ and $(x_{max}, y_{max})$ as one diagonal may be determined to be the second ROI ROI2 in the second camera image IM2.

FIG. 6 is a diagram for describing an operation of obtaining skeleton data (second skeleton data HC2) of the object (e.g., hand) from the second ROI ROI2 in the other camera image (the second camera image IM2), according to one embodiment.

Referring to FIG. 6, a skeleton of the hand may be detected from a location of the hand (an ROI). A third deep learning algorithm or other algorithms may be used for the operation of detecting the skeleton of the hand. The detected skeleton of the hand may include 2D coordinate information.

In one embodiment, the operation of obtaining the second skeleton data HC2 of the hand from the second ROI ROI2 in the second camera image IM2 may be performed similarly to the operation of obtaining the first skeleton data HC1 of the hand from the first ROI ROI1 in the first camera image IM1 described above with reference to FIG. 4. For example, the second deep learning algorithm or other algorithms may be used in the operation of detecting the second skeleton data HC2, and in this case, the detected skeleton of the hand may also include 3D coordinate information.

In one embodiment, the first skeleton data HC1 and the second skeleton data HC2 are skeleton data of the same hand, and keypoints included in the first skeleton data HC1 may respectively correspond in a one-to-one manner to keypoints included in the second skeleton data HC2. Therefore, in subsequent operations for obtaining 3D skeleton data of the user's hand, a 3D skeleton structure of the user's hand may be calculated based on a disparity between a pair of 2D joint coordinates corresponding in a one-to-one manner to each other.

Figure 7:
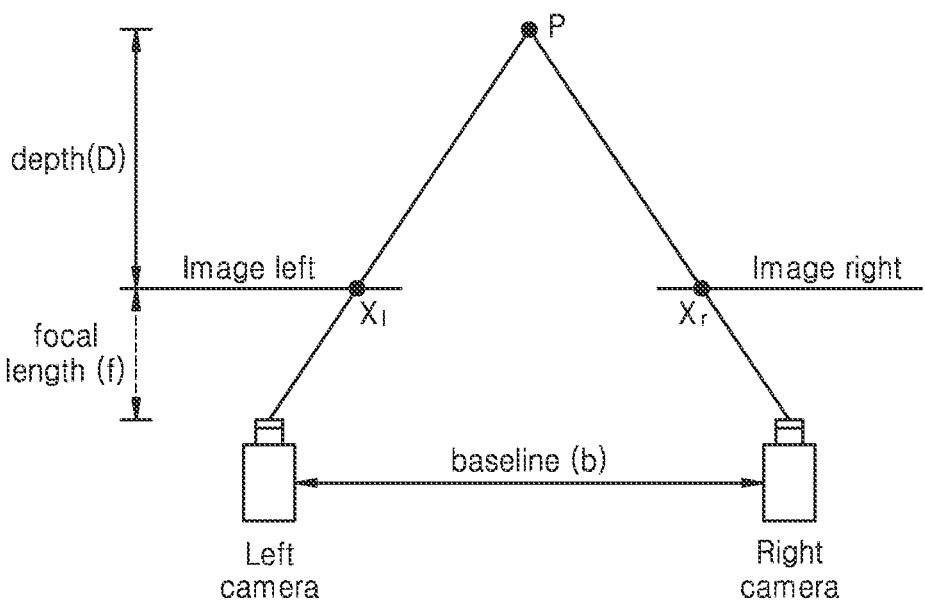
FIG. 7 is a diagram for describing an operation of obtaining 3D skeleton data of an object, based on pieces of skeleton data of the object obtained from different camera images, according to one embodiment.
Figure 8:
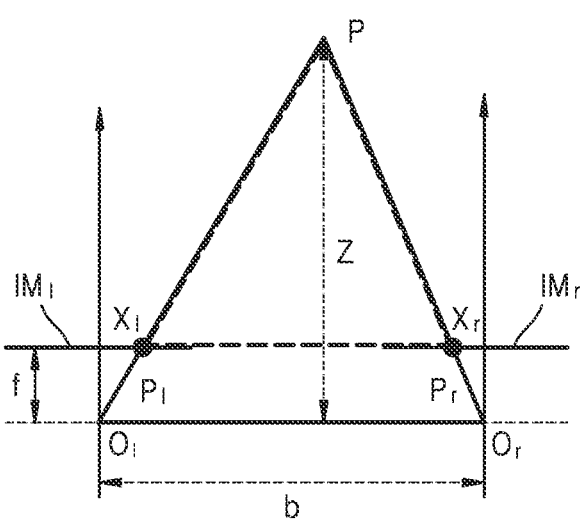
FIG. 8 is a diagram for describing an operation of obtaining 3D skeleton data of an object, based on pieces of skeleton data of the object obtained from different camera images, according to one embodiment.

FIG. 7 is a diagram for describing an operation of obtaining 3D skeleton data of an object, based on pieces of skeleton data of the object (e.g., hand) obtained from different camera images, according to one embodiment, and FIG. 8 is a diagram for describing an operation of obtaining 3D skeleton data of an object, based on pieces of skeleton data of the object (e.g., hand) obtained from different camera images, according to one embodiment.

An operation of obtaining 3D coordinates of the hand when second hand coordinates obtained from a second camera image correspond to 2D coordinate information may be described with reference to FIGS. 7 and 8. For example, second skeleton data obtained from the second camera image may include 2D coordinate values of joints. First skeleton data obtained from a first camera image may include 2D coordinate values or 3D coordinate values of joints. When the first skeleton data obtained from the first camera image includes 3D coordinate values of the joints, in order to calculate 3D coordinate values of the joints using disparity according to stereo vision, the 3D coordinate values in the first skeleton data may be projected to 2D coordinate values on a plane of the first camera image. Thereafter, 3D depth information of each of the joints may be obtained by calculating a disparity between a pair of 2D coordinates based on information about a relative position between first and second cameras. Hereinafter, an operation of generating 3D coordinates using a 2D coordinate pair for a keypoint is described in detail with reference to FIGS. 7 and 8.

FIG. 7 illustrates a view of the two cameras and the user's hand in an x-z plane. The user's hand may be located at point P. For example, when calculating 3D depth information of a particular keypoint, the position of the keypoint may be represented as point P. Referring to FIG. 7, the following proportion equation may be obtained from a triangle formed by (P, $x_l$, $x_r$) and a triangle formed by (P, Left camera, Right camera).

$$b + x_r - x_l : b = Z - f : Z$$

Here, Z represents a depth from a camera to the particular point P. A Z value may correspond to a D+f value. The depth Z may be calculated as follows by using the proportion equation.

$$\lvert Z = f * \frac{b}{x_l - x_r}$$

Subsequently, p=($x_l$, $y_l$, Z, 1) may be constructed by using 2D coordinates ($x_l$,$y_l$) obtained from the first camera (e.g., the left camera) and the obtained depth (Z) value.

Next, the 2D coordinates obtained from the first camera may be converted to 3D coordinates based on p.

$$(x, y, z) = (R \times p) + T$$

$$\lvert R = \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix}$$

$$T = \begin{bmatrix} 1 & 0 & 0 & -C_x \\ 0 & 1 & 0 & -C_y \\ 0 & 0 & 1 & -C_z \\ 0 & 0 & 0 & 1 \end{bmatrix}$$

Here, R may be a parameter representing an axis rotation angle from the first camera to a preset origin (e.g., a center point of the electronic device or a middle point between the first camera and the second camera) to the camera (e.g., the second camera), and T may a parameter representing a distance from the first camera to the preset origin (e.g., the center point of the electronic device or the middle point between the first camera and the second camera).

Referring to FIG. 8, 3D coordinates of a keypoint may be calculated from 2D x-coordinates ($x_l$ and $x_r$) of corresponding keypoints that form a pair in two images IM$_l$ and IM$_r$. A triangulation method may be used to calculate the 3D coordinates of the keypoint. The first camera and the second camera may be respectively located at points $O_l$ and $O_r$. In this case, the following equations may be obtained according to ratios of triangles.

$$\frac{b}{Z} = \frac{b + x_l - x_r}{Z - f}$$

$$\lvert Z = \frac{f \cdot b}{x_l - x_r}$$

$$\lvert X = \frac{f \cdot X}{Z} + p_X$$

Here, b represents a distance between the first camera and the second camera. b may be determined according to a relative position between the first camera and the second camera. b may correspond to 'b' of FIG. 7 described above, and may be expressed as a baseline.

When an image captured by the left camera (the first camera) is referred to as a first image, 2D coordinates ($x_l$, $y_l$) of a first hand joint with the origin located at a bottom left corner of the first image may be obtained. Similarly, when an image captured by the right camera (the second camera) is referred to as a second image, 2D coordinates ($x_r$, $y_r$) of a second hand joint with an origin located at a bottom left corner of the second image may be obtained.

When computation is performed only on an x-coordinate value of the particular point P to obtain a depth (Z) value, the Z value is a z-coordinate value, and a y-coordinate value may be calculated by using the Z value. Therefore, 3D coordinates ($x_p$,$y_p$,$z_p$) of the keypoint may be obtained even when the computation is performed only on the x-coordinate value.

In one embodiment, the first skeleton data obtained from the first image may include 3D coordinate values of the joints, and the second skeleton data obtained from the second image may include 3D coordinate values of the joints. In this case, the electronic device may obtain 3D skeleton data of the hand by calculating an average of coordinate values in the first skeleton data and corresponding coordinate values in the second skeleton data. In one embodiment, the electronic device may obtain 3D skeleton data of the hand by combining the 3D coordinate values in the first skeleton data with the 3D coordinate values in the second skeleton data by using a weight. For example, a weight for combining 3D coordinate values of a first joint with 3D coordinate values of a second joint may be determined based on 3D joint coordinate values in a previous frame on a time axis. In one embodiment, 3D hand joint coordinates in the previous frame may be taken into account for stable hand position tracking and gesture recognition. This may prevent a position and a shape of the user's hand from being discontinuously calculated in a video sequence.

Figure 9:
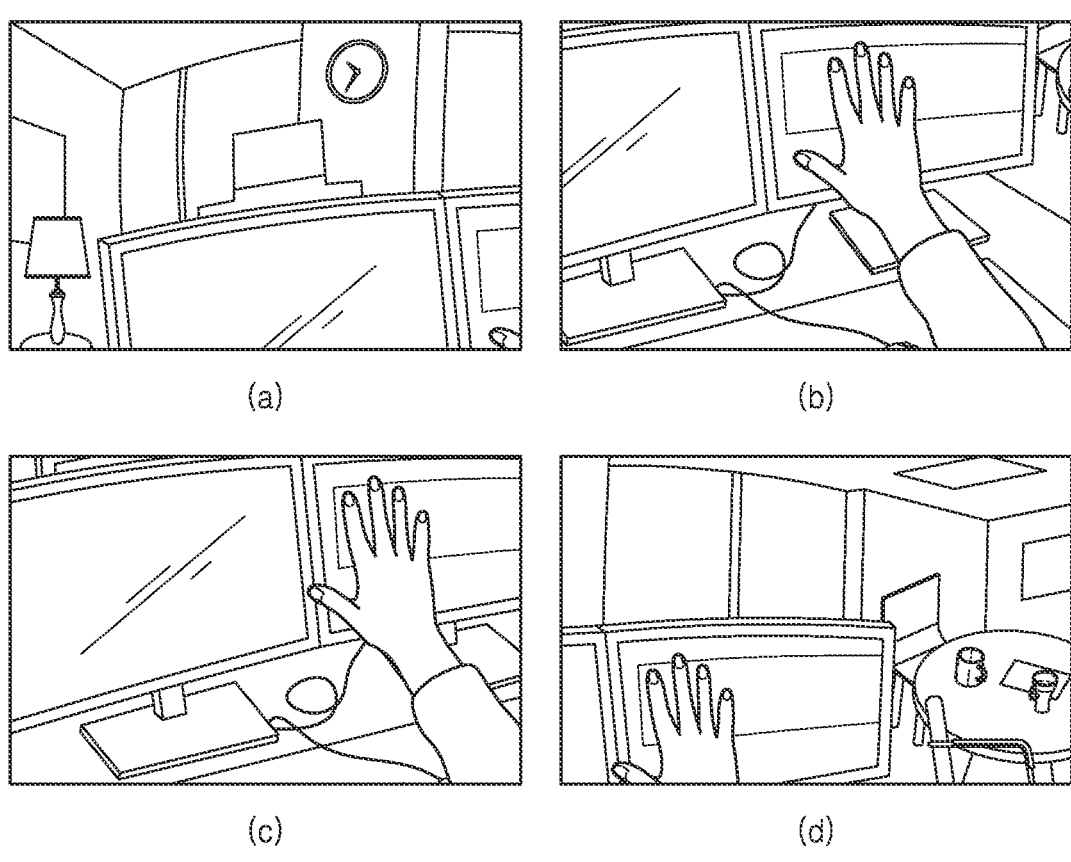
FIG. 9 is a diagram for describing an operation, performed by an electronic device including a plurality of cameras, of determining at least one camera image for use in a method of obtaining 3D skeleton data of a hand from among a plurality of camera images, according to one embodiment.

FIG. 9 is a diagram for describing an operation, performed by an electronic device including a plurality of cameras, of determining at least one camera image for use in a method of obtaining 3D skeleton data of an object (e.g., a hand) from among a plurality of camera images, according to one embodiment.

In one embodiment, the electronic device may include four cameras located at different positions, and the four cameras may respectively obtain an image (a), an image (b), an image (c), and an image (d). Prior to performing an operation corresponding to operation 120 of FIG. 1 described above, i.e., obtaining a first ROI including a hand image corresponding to a user's hand from a first image, the electronic device may determine the first image and the second image among the four images obtained by the four cameras. For example, as shown in FIG. 9, the electronic device may respectively determine the image (b) and the image (c) as the first image and the second image. Subsequently, the electronic device may obtain the first ROI from the image (b) which is the first image.

In one embodiment, a first camera that is a main camera for tracking the user's hand among the plurality of cameras may be preset. For example, the first camera may be a camera for imaging a lower front region in which a user's gesture interaction usually occurs. The electronic device may determine the second camera from among cameras excluding the first camera. The second camera may be determined according to a relative position of the first ROI in the first image captured via the first camera, the first ROI being obtained from the first image, a position at which the first camera is located, and a position at which the second camera is disposed. When the first camera is preset, the operation of the electronic device determining the second camera among the cameras excluding the first camera may be performed between operations 120 and 140 described above with reference to FIG. 1.

Figure 10:
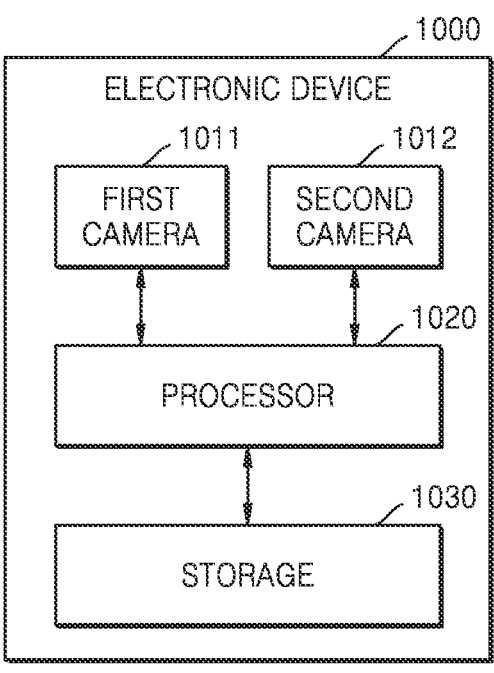
FIG. 10 is a block diagram of an electronic device according to one embodiment.

FIG. 10 is a block diagram of an electronic device 1000 according to one embodiment.

The electronic device 1000 may be a device for obtaining 3D skeleton data of an object (e.g., a user's hand) from 2D videos or images obtained using a plurality of cameras. For example, the electronic device 1000 may include various wearable devices, such as AR glasses in the form of eye glasses worn by the user on the face, a HMD, a VRH, or an ARH worn on the head, etc. However, according to one embodiment, the electronic device 1000 is not limited to the above-described examples and may include various types of devices that have a plurality of cameras and obtain and process videos or images.

Referring to FIG. 10, the electronic device 1000 may include a first camera 1011, a second camera 1012, a processor 1020, and a storage 1030. The electronic device 1000 may be implemented with more or fewer components than those illustrated in FIG. 10.

The first camera 1011 and the second camera 1012 may include a digital imaging device. In one embodiment, each of the first camera 1011 and the second camera 1012 may obtain an input video or an input image. In one embodiment, each of the first camera 1011 and the second camera 1012 may capture a video or an image corresponding to an angle of view.

In one embodiment, each of the first camera 1011 and the second camera 1012 may obtain a 2D image. The electronic device 1000 may obtain an image of a front region including an image corresponding to the user's hand by using the first camera 1011 and the second camera 1012.

The storage 1030 may store programs to be executed by the processor 1020 to control operations of the electronic device 1000, as described below. The storage 1030 may store a program including at least one instructions for controlling operations of the electronic device 1000. The storage 1030 may store instructions and program code that are readable by the processor 1020. In one embodiment, the processor 1020 may be implemented to execute instructions or code of a program stored in the storage 1030. The storage 1030 may store data input to or output from the electronic device 1000.

For example, the storage 1030 may include at least one type of storage medium, i.e., at least one of a flash memory-type memory, a hard disk-type memory, a multimedia card micro-type memory, a card-type memory (e.g., an SD card or an XD memory), Random Access Memory (RAM), Static RAM (SRAM), Read-Only Memory (ROM), Electrically Erasable Programmable ROM (EEPROM), Programmable ROM (PROM), a magnetic memory, a magnetic disc, or an optical disc. However, the storage 1030 is not limited to the above-described examples, and may include any type of storage medium in which data may be stored.

The processor 1020 may control all operations of the electronic device 1000. The processor 1020 may execute instructions or programs stored in the storage 1030 to control all operations of the first camera 1011, the second camera 1012, and the storage 1030.

The processor 1020 may include hardware components for performing arithmetic, logic and input/output (I/O) operations and signal processing. For example, the processor 1020 may consist of at least one of a CPU, a microprocessor, a Graphics Processing Unit (GPU), Application Specific Integrated Circuits (ASICs), Digital Signal Processors (DSPs), Digital Signal Processing Devices (DSPDs), Programmable Logic Devices (PLDs), or Field Programmable Gate Arrays (FPGAs), but is not limited thereto.

By executing at least one instruction stored in the storage 1030, the processor 1020 may obtain the entire 3D skeleton structure of the object (e.g., user's hand) even when the processor 1020 performs an operation of detecting an ROI including an image corresponding to the user's hand only with respect to a first image obtained via the first camera 1011. For example, by executing the at least one instruction stored in the storage 1030, the processor 1020 may obtain a first image via the first camera 1011 and a second image via the second camera 1012, obtain a first ROI including a hand image from the first image, obtain first skeleton data including at least one keypoint of the hand from the first ROI, obtain a second ROI from the second image, based on the first skeleton data and information about a relative position between the first camera and the second camera, obtain second skeleton data including at least one keypoint of the hand from the second ROI, and obtain 3D skeleton data of the hand, based on the first skeleton data and the second skeleton data.

An operation in which the processor 1020 obtains the first image via the first camera 1011 and the second image via the second camera 1012 may correspond to operation S210 of FIG. 2 as described above. An operation in which the processor 1020 obtains the first ROI including the hand image from the first image may correspond to operation S220 of FIG. 2 as described above. An operation in which the processor 1020 obtains the first skeleton data including the at least one keypoint of the hand from the first ROI may correspond to operation S230 of FIG. 2 as described above. An operation in which the processor 1020 obtains the second ROI from the second image based on the first skeleton data may correspond to operation S240 of FIG. 2 as described above. An operation in which the processor 1020 obtains the second skeleton data including the at least one keypoint of the hand from the second ROI may correspond to operation S250 of FIG. 2 as described above. An operation in which the processor 1020 obtains the 3D skeleton data of the hand, based on the first skeleton data and the second skeleton data, may correspond to operation S260 of FIG. 2 as described above.

As described above, according to one embodiment, the number of times that a detection operation for identifying a location of the hand in an image is performed may be reduced by performing an operation of detecting an ROI including an image corresponding to the hand only with respect to an image obtained using one of a plurality of cameras included in the electronic device, so that a total computation time required for an operation of obtaining 3D skeleton data of the hand and the amount of power consumed by the electronic device may be reduced.

An embodiment of the disclosure may be implemented or supported by one or more computer programs which may be created from computer-readable program code and recorded on computer-readable media. In the disclosure, an "application" and a "program" refer to one or more computer programs, software components, a set of instructions procedures, functions, objects, classes, instances, associated data, or parts thereof, which are suitable for implementation in computer-readable program code. "Computer-readable program code" may include various types of computer code including source code, object code, and executable code. "Computer-readable media" may include various types of media that are accessible by a computer, such as ROM, RAM, a hard disk drive (HDD), compact discs (CDs), digital video discs (DVDs), and various types of memory.

A computer-readable storage medium may be provided in the form of a non-transitory storage medium. In this regard, the 'non-transitory storage medium' is a tangible device, and may exclude wired, wireless, optical, or other communication links that transmit transient electrical or other signals. Moreover, the 'non-transitory storage medium' does not differentiate between where data is semi-permanently stored in the storage medium and where the data is temporarily stored in the storage medium. For example, the 'non-transitory storage medium' may include a buffer in which data is temporarily stored. The computer-readable media may be any available media that are accessible by the computer and may include both volatile and non-volatile media and both detachable and non-detachable media. The computer-readable media may include media in which data may be permanently stored and media in which data may be stored and then overwritten, such as a rewritable optical disk or an erasable memory device.

According to an embodiment of the disclosure, a method according to one embodiment set forth herein may be included in a computer program product when provided. The computer program product may be traded, as a product, between a seller and a buyer. For example, the computer program product may be distributed in the form of a computer-readable storage medium (e.g., compact disc (CD)-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally created on a computer-readable storage medium, such as a server of a manufacturer, a server of an application store, or a memory of a relay server.

The above description of the disclosure is provided for illustration, and one of ordinary skill in the art will understand that changes in form and details may be readily made therein without departing from technical idea or essential characteristics of the disclosure. Accordingly, the above-described embodiments of the disclosure and all aspects thereof are merely examples and are not limiting. For example, each component defined as an integrated component may be implemented in a distributed fashion, and likewise, components defined as separate components may be implemented in an integrated form.

The scope of the disclosure is defined not by the detailed description thereof but by the following claims, and all the changes or modifications within the meaning and scope of the appended claims and their equivalents should be construed as being included in the scope of the disclosure.

What is claimed is:

1. A method, performed by an electronic device, of obtaining Three-Dimensional (3D) skeleton data of an object by using a first camera and a second camera, the method comprising:
    obtaining a first image using the first camera and obtaining a second image using the second camera;
    obtaining, from the first image, a first Region Of Interest (ROI) within the first image, the first ROI comprising the object;
    obtaining, from the first ROI within the first image, first skeleton data comprising at least one keypoint of the object;
    projecting 3D position coordinates of the at least one keypoint of the object to two-dimensional (2D) position coordinates on the second image, based on information about a relative position between the first camera and the second camera;
    identifying, in the second image, second ROI having the 2D position coordinates of the at least one keypoint;
    obtaining, from the second ROI, second skeleton data comprising the at least one keypoint of the object; and
    obtaining the 3D skeleton data of the object, based on the first skeleton data and the second skeleton data.

2. The method of claim 1, wherein the object is a hand or a body part of a user.

3. The method of claim 1, wherein, in the obtaining of the first ROI from the first image, a first deep learning model trained to use the first image as an input value and output an image region comprising the object as the first ROI is used.

4. The method of claim 1, wherein, in the obtaining of the first skeleton data from the first ROI, a second deep learning model trained to use the first ROI as an input value and output, as the first skeleton data, a graph comprising the at least one keypoint of the object as a joint is used.

5. The method of claim 1, wherein the first skeleton data comprises 3D position coordinates of the at least one keypoint with respect to a preset origin in space.

6. The method of claim 1, wherein the second skeleton data comprises 2D position coordinates of the at least one keypoint with respect to a preset origin on a plane of the second image.

7. The method of claim 6, wherein, in the obtaining of the second skeleton data from the second ROI, a third deep learning model trained to use the second ROI as an input value and output, as the second skeleton data, a graph comprising the at least one keypoint of the object as a joint is used.

8. The method of claim 6, wherein the first skeleton data comprises 3D position coordinates of the at least one keypoint with respect to a preset origin in space, and
    wherein the obtaining of the 3D skeleton data of the object based on the first skeleton data and the second skeleton data comprises:
        projecting the 3D position coordinates of the at least one keypoint, the 3D position coordinates being included in the first skeleton data, to 2D position coordinates on a plane of the first image; and
        obtaining 3D position coordinates, based on the 2D position coordinates projected on the plane of the first image and the 2D position coordinates included in the second skeleton data.

9. The method of claim 1, wherein the second skeleton data comprises 3D position coordinates of the at least one keypoint with respect to a preset origin in space.

10. The method of claim 9, wherein, in the obtaining of the second skeleton data from the second ROI, a second deep learning model trained to use the second ROI as an input value and output, as the second skeleton data, a graph comprising the at least one keypoint of the object as a joint is used.

11. The method of claim 9, wherein the first skeleton data comprises 3D position coordinates of the at least one keypoint with respect to a preset origin in space, and wherein the obtaining of the 3D skeleton data of the object based on the first skeleton data and the second skeleton data comprises obtaining 3D position coordinates of the at least one keypoint, based on an average value of the 3D position coordinates included in the first skeleton data and the 3D position coordinates included in the second skeleton data.

12. The method of claim 1, wherein the obtaining of the 3D skeleton data of the object based on the first skeleton data and the second skeleton data comprises obtaining 3D position coordinates of the at least one keypoint, based on a value obtained by weight-combining position coordinates in the first skeleton data with position coordinates in the second skeleton data.

13. An electronic device comprising:

a first camera;

a second camera;

a storage storing at least one instruction; and at least one processor configured to electrically connect with the first camera and the second camera and configured to execute the at least one instruction stored in the storage to:

obtain a first image via the first camera and obtain a second image via the second camera, obtain, from the first image, a first Region Of Interest (ROI) within the first image, the first ROI comprising an object, obtain, from the first ROI within the first image, first skeleton data comprising at least one keypoint of the object, projecting three-dimensional (3D) position coordinates of the at least one keypoint of the object to two-dimensional (2D) position coordinates on the second image, based on information about a relative position between the first camera and the second camera, identifying, in the second image, second ROI having the 2D position coordinates of the at least one keypoint, obtain, from the second ROI, second skeleton data comprising the at least one keypoint of the object, and obtain the 3D skeleton data of the object, based on the first skeleton data and the second skeleton data.

14. A non-transitory computer-readable recording medium having recorded thereon a program for performing the method of claim 1, on a computer.

* * * * *